United States Patent
Yamada et al.

(10) Patent No.: US 8,882,078 B2
(45) Date of Patent: Nov. 11, 2014

(54) FLOW RATE CONTROL VALVE AND ASSEMBLY METHOD THEREFOR

(75) Inventors: Hirosuke Yamada, Tsukubamirai (JP); Sanae Nakamura, Toride (JP); Akira Kuribayashi, Meguro-ku (JP)

(73) Assignee: SMC Kabushiki Kaisha, Tokyo (JP)

( * ) Notice: Subject to any disclaimer, the term of this patent is extended or adjusted under 35 U.S.C. 154(b) by 508 days.

(21) Appl. No.: 13/254,073

(22) PCT Filed: Aug. 12, 2009

(86) PCT No.: PCT/JP2009/064477
§ 371 (c)(1),
(2), (4) Date: Aug. 31, 2011

(87) PCT Pub. No.: WO2010/109690
PCT Pub. Date: Sep. 30, 2010

(65) Prior Publication Data
US 2011/0309284 A1 Dec. 22, 2011

(30) Foreign Application Priority Data
Mar. 26, 2009 (JP) ................................. 2009-076999

(51) Int. Cl.
*F16K 27/02* (2006.01)
*F16K 1/42* (2006.01)
*F16K 1/38* (2006.01)
*F16K 1/04* (2006.01)

(52) U.S. Cl.
CPC ... *F16K 1/42* (2013.01); *F16K 1/38* (2013.01); *F16K 1/04* (2013.01); *F16K 27/02* (2013.01)
USPC ............ 251/121; 251/218; 251/264; 251/324

(58) Field of Classification Search
USPC .......... 251/120–122, 218, 221–224, 264, 324
See application file for complete search history.

(56) References Cited

U.S. PATENT DOCUMENTS 928,751 A * 7/1909 Harcourt ....................... 251/223
2,629,580 A 2/1953 Schultis et al.
(Continued)

FOREIGN PATENT DOCUMENTS

| CN | 1080257 A | 1/1994 |
| CN | 101205975 A | 6/2008 |

(Continued)

OTHER PUBLICATIONS

International Search Report Issued Jan. 28, 2010 in PCT/JP09/064477 filed Aug. 12, 2009.

(Continued)

*Primary Examiner* — John Bastianelli
(74) *Attorney, Agent, or Firm* — Oblon, Spivak, McClelland, Maier & Neustadt, L.L.P.

(57) ABSTRACT

A flow rate control valve, which is capable of controlling the flow rate of a fluid that flows between a pair of ports by displacing a rod, includes a valve mechanism in an axial direction. The valve mechanism includes a body having the ports and a pair of fluid passages through which fluid supplied from the ports flows. The valve mechanism includes a sub-body disposed in an interior of the body, and in which the rod is screw-engaged in an advancing and retracting manner. The valve mechanism also includes a tubular shaped seat connected to an end of the sub-body, including a seat structure to seat the rod thereon, and a hole that communicates between one of the fluid passages and another of the fluid passages.

12 Claims, 5 Drawing Sheets

(56) References Cited

U.S. PATENT DOCUMENTS

| | | | |
|---|---|---|---|
| 3,035,780 A * | 5/1962 | Peras | 239/453 |
| 3,761,052 A | 9/1973 | Tobbe et al. | |
| 4,337,788 A * | 7/1982 | Seger | 137/315.02 |
| 4,431,021 A | 2/1984 | Scaramucci | |
| 4,732,364 A * | 3/1988 | Seger et al. | 251/368 |
| 5,211,317 A | 5/1993 | Diamond et al. | |
| 5,634,627 A * | 6/1997 | Daido et al. | 251/335.3 |
| 5,769,391 A * | 6/1998 | Noller et al. | 251/129.21 |
| 6,409,055 B1 * | 6/2002 | Officier | 222/559 |
| 6,494,229 B2 * | 12/2002 | Kajitani | 137/530 |
| 6,619,612 B2 * | 9/2003 | Freisinger et al. | 251/30.03 |
| 6,840,274 B1 * | 1/2005 | Williamson et al. | 137/588 |
| 7,007,917 B2 * | 3/2006 | Choi et al. | 251/65 |
| 7,954,511 B2 | 6/2011 | Kohlberger et al. | |
| 2004/0144863 A1 | 7/2004 | Kendrick et al. | |
| 2004/0144864 A1 | 7/2004 | Valpey et al. | |
| 2006/0026817 A1 | 2/2006 | Valpey et al. | |
| 2008/0111089 A1 | 5/2008 | Hasunuma | |

FOREIGN PATENT DOCUMENTS

| | | |
|---|---|---|
| CN | 101220866 A | 7/2008 |
| GB | 288 845 | 4/1928 |
| JP | 05-022952 U | 3/1993 |
| JP | 09-137867 A | 5/1997 |
| JP | 2001 141090 | 5/2001 |
| JP | 2001-263501 A | 9/2001 |
| JP | 2007-002930 A | 1/2007 |
| JP | 2008-540959 A | 11/2008 |
| JP | 4342660 B2 | 7/2009 |
| WO | WO 2007/065776 A1 | 6/2007 |

OTHER PUBLICATIONS

Combined Office Action and Search Report issued Aug. 12, 2013 in Chinese Patent Application No. 200980158346.1 (with English translation).

Office Action issued Sep. 3, 2013 in Korean Application No. 10-2011-7022691 (With Partial English Translation).

Japanese Office Action issued Aug. 6, 2013 in Patent Application No. 2011-534847 with Partial English Translation.

"Brochure for Speed Control Valve", Manufactured by CKD (No. CC-701), Dec. 10, 2003, (English Translation of Reference is not available, Submitting Abridged Translation Portion of "Rejection of Application" dated Aug. 6, 2013 which is relevant to this reference), 8 pages.

Combined Office Action and Search Report issued Jan. 14, 2014 in Chinese patent Application No. 200980158346.1 (with English translation).

Office Action issued Sep. 3, 2013 in Korean Application No. 10-211-7022691 (With Partial English Translation).

Office Action and Search Report issued Dec. 27, 2012 in Chinese Patent Application No. 200980158346.1 (with English translation).

Notice of Allowance issued Apr. 30, 2014 in Japanese Patent Application No. 2011-534847 (with partial English language translation).

* cited by examiner

FLOW RATE CONTROL VALVE AND ASSEMBLY METHOD THEREFOR

TECHNICAL FIELD

The present invention relates to a flow rate control valve, which is capable of controlling the flow rate of a fluid that flows between a pair of ports, by displacing in an axial direction a rod including a valve member, as well as a method for assembling such a flow rate control valve.

BACKGROUND ART

Heretofore, a flow rate control valve and assembly method therefor have been known, in which the flow rate control valve is connected via piping to a fluid pressure apparatus such as a cylinder or the like, and which is capable of controlling operations of the fluid pressure apparatus by adjusting the flow rate of a fluid that is supplied to and discharged from the fluid pressure apparatus.

With such a flow rate control valve, for example, as disclosed in Japanese Laid-Open Patent Publication No. 2001-141090, in a center portion of a body which is formed in a tubular shape, a tubular shaped valve main body is installed perpendicularly with respect to a longitudinal direction of the body. A throttling valve for adjusting the flow rate of a fluid that flows through the interior of the body is screw-engaged so as to be capable of advancing and retracting in an insertion hole of the valve main body. A lower end side of the throttling valve which faces the body is formed in a gradually tapered shape. Further, on the lower end of the valve main body, a check valve is disposed on an outer peripheral surface thereof, which abuts against a guide wall formed in the fluid passage inside the body, and multiple holes that communicate between exterior and interior regions of the valve main body open into the center portion along the axial direction of the valve main body.

Additionally, by rotating the throttling valve and effecting advancing and retracting movements thereof, the size of a gap formed between a lower end portion of the throttling valve and the valve main body is changed, such that a fluid supplied from one of the fluid passages flows to the other fluid passage, while the flow rate of the fluid is controlled by flowing through the interior of the valve main body, through the hole and passing through the gap. By controlling the flow rate of the fluid so as to obtain a desired flow rate, operations of the fluid pressure apparatus connected to the fluid control valve are controlled.

However, in the aforementioned conventional technique, for example, when the valve main body is manufactured, after the outer shape thereof is formed by a cutting process, the multiple holes therein are formed in yet another process step. Therefore, the manufacturing steps (process steps) are greater in number and complex. Further, recently, there has been a demand to decrease the manufacturing cost required for fluid control valves, as well as to improve productivity and the ease with which fluid control valves can be manufactured.

SUMMARY OF INVENTION

The present invention has a general object of providing a flow rate control valve, which is capable of reducing manufacturing costs and improving productivity, by simplifying the structure of the flow rate control valve.

The present invention is characterized by a flow rate control valve, which is capable of controlling the flow rate of a fluid that flows between a pair of ports by displacing a rod having a valve member in an axial direction, comprising a body having such ports and a pair of fluid passages through which fluid supplied from the ports flows, a sub-body disposed in an interior of the body and in which the rod is screw-engaged in an advancing and retracting manner, and a tubular shaped seat member connected to an end of the sub-body, having a seat portion for seating of the valve member thereon, and a hole that communicates between one of the fluid passages and another of the fluid passages.

According to the present invention, the sub-body in which the rod is screw-engaged is installed in the interior of the body, and the tubular shaped seat member is connected integrally to an end of the sub-body. Further, a seat portion on which the valve member of the rod is seated, and a hole that communicates between fluid passages formed in the body, are formed in the seat member.

Accordingly, the sub-body and the seat member are made up of separate bodies, and since the tubular shaped seat member can be assembled and connected integrally with respect to an end portion of the sub-body, assembly thereof can be performed efficiently, along with improving productivity when the flow rate control valve is manufactured.

The above and other objects features and advantages of the present invention will become more apparent from the following description when taken in conjunction with the accompanying drawings in which a preferred embodiment of the present invention is shown by way of illustrative example.

DESCRIPTION OF EMBODIMENTS

Figure 1:
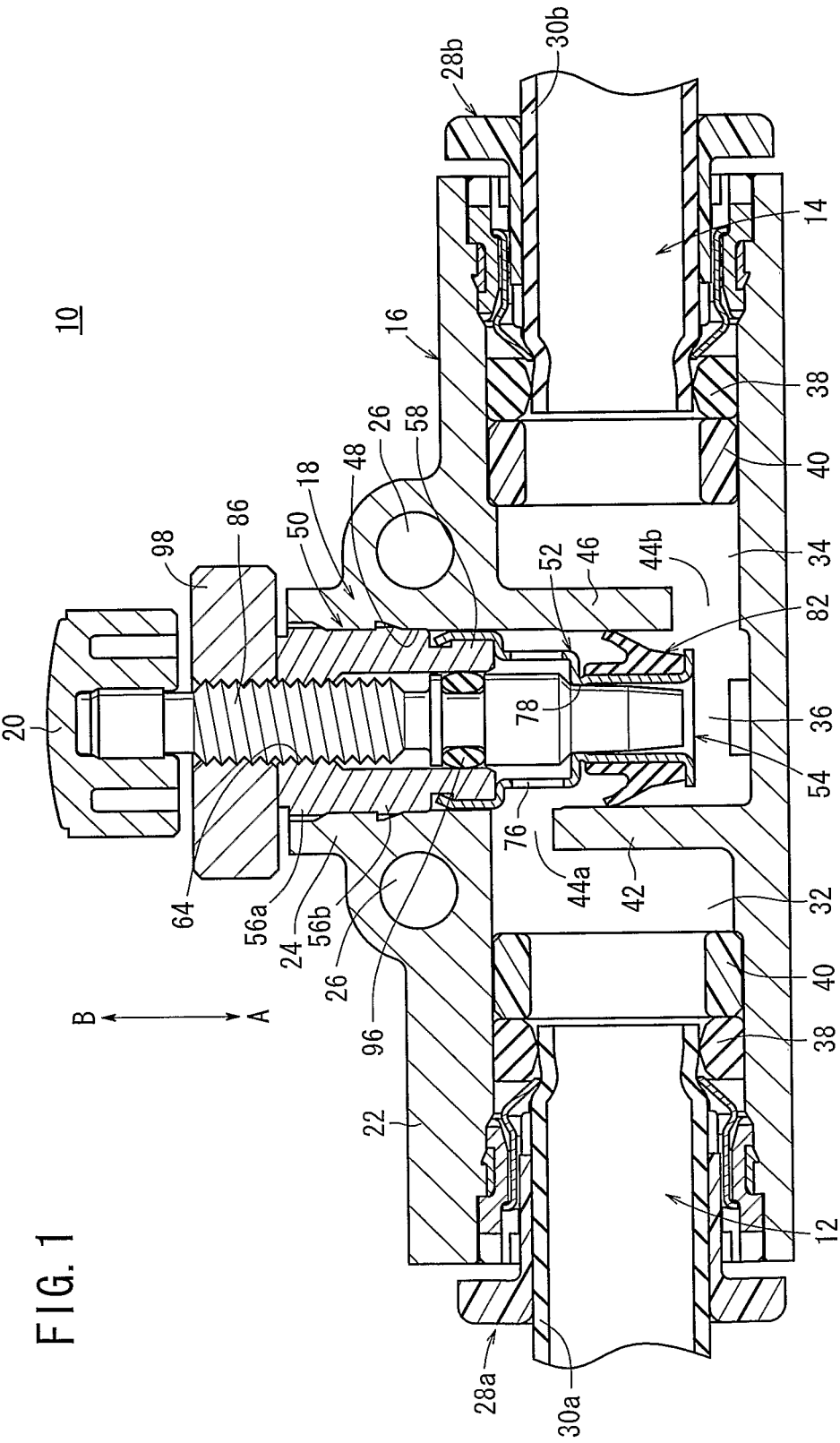
FIG. 1 is an overall vertical cross sectional view of a flow rate control valve, to which an assembly method for a flow rate control valve according to an embodiment of the present invention is applied.
Figure 2:
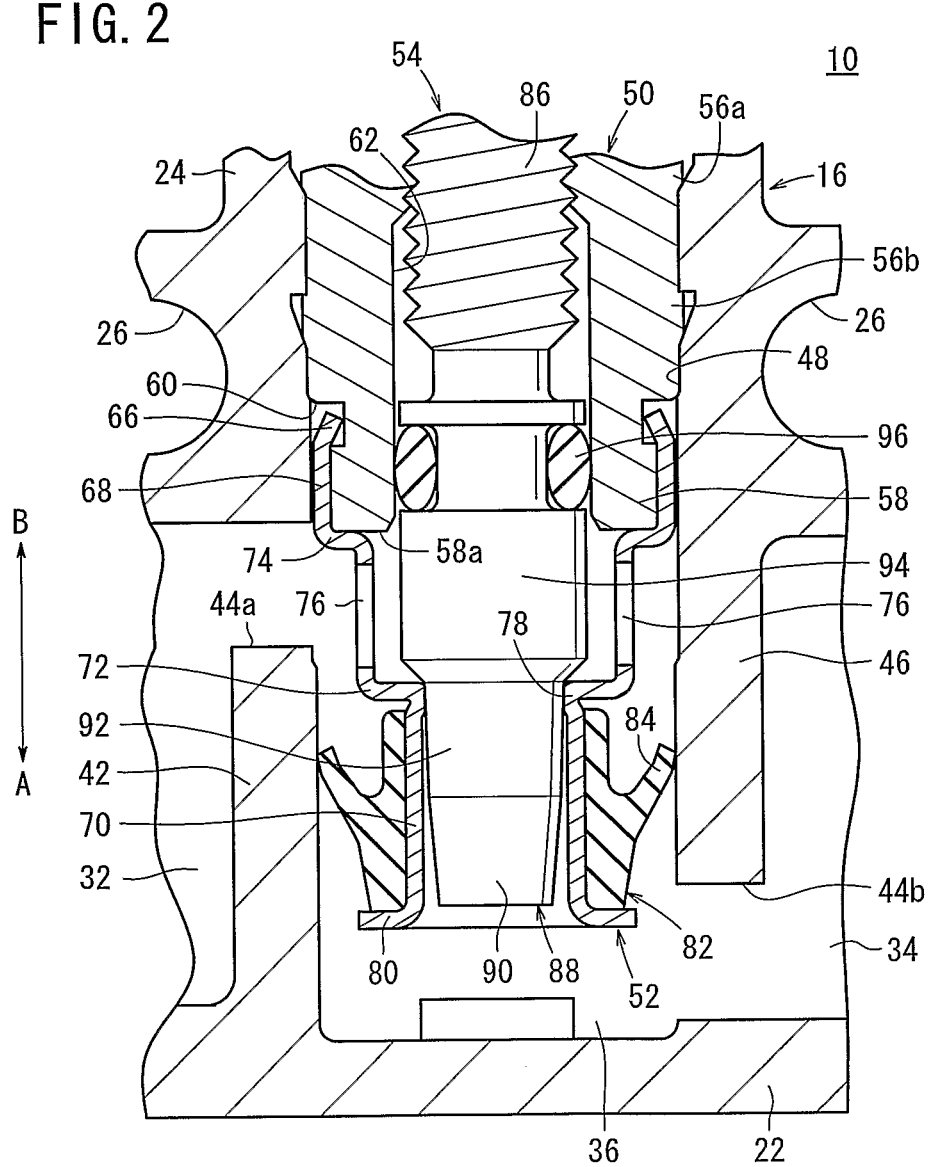
FIG. 2 is an enlarged cross sectional view showing the vicinity of a needle valve, a valve holder and a seat ring constituting the flow rate control valve of FIG. 1.
Figure 3:
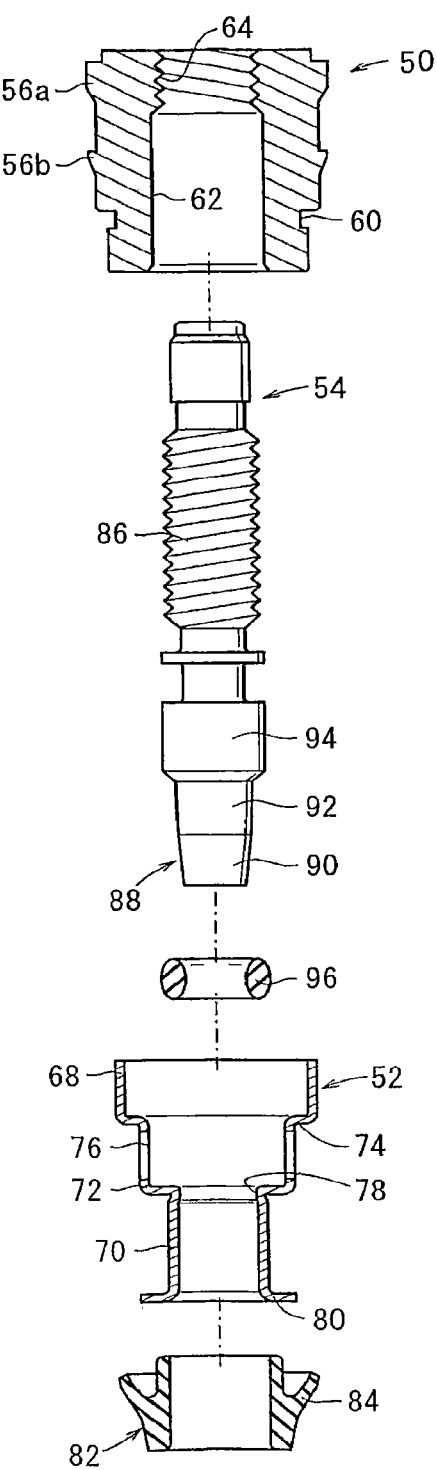
FIG. 3 is an exploded cross sectional view of FIG. 2.
Figure 4:
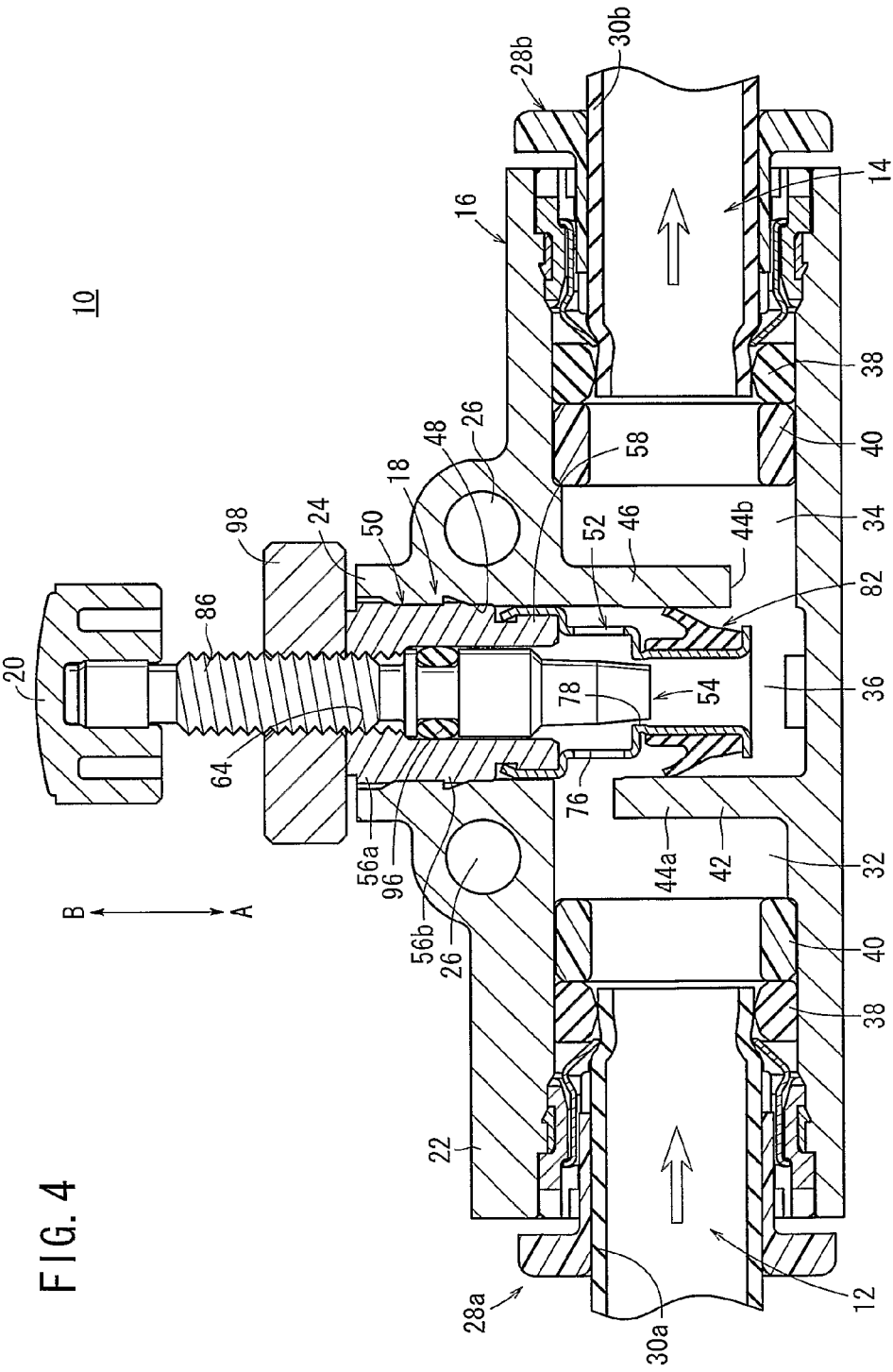
FIG. 4 is an overall cross sectional view showing a valve open state in the flow rate control valve of FIG. 1, in which a needle valve is displaced upwardly by operating a handle, and a valve member of the needle valve separates from the seat ring.
Figure 5:
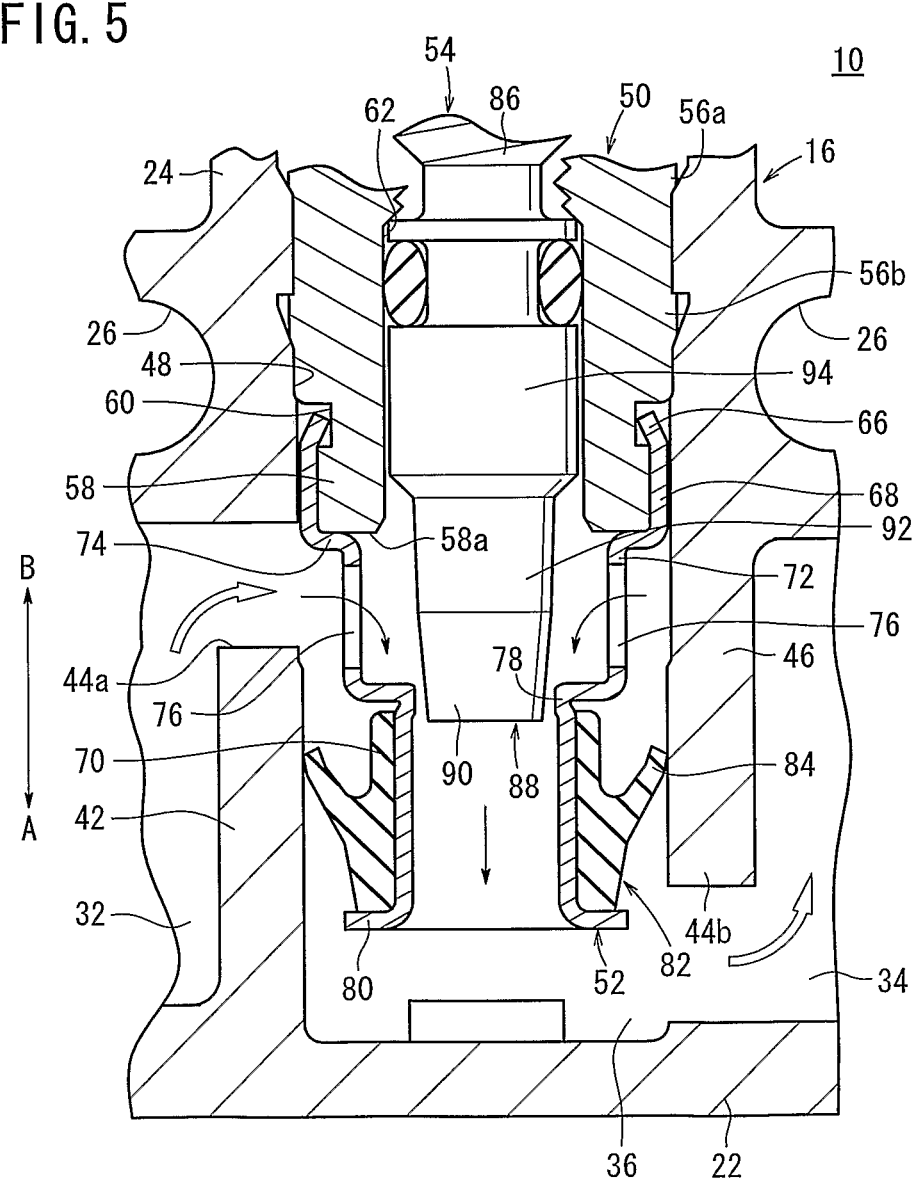
FIG. 5 is an enlarged cross sectional view showing the vicinity of a needle valve, a valve holder and a seat ring constituting the flow rate control valve of FIG. 4.

As shown in FIGS. 1 to 5, a flow rate control valve 10 includes a body 16 having first and second ports (ports) 12, 14 through which a fluid is supplied and discharged, a valve mechanism (valve member) 18 disposed in a central portion of the body 16 for controlling a flow state of a pressure fluid (e.g., pressurized air) that flows from the first port 12 to the second port 14, and a handle 20 for manually controlling a flow rate of the pressure fluid by means of the valve mechanism 18.

FIG. 1 shows a totally closed state in which communication between the first port 12 and the second port 14 is blocked by a needle valve (rod) 54 (discussed later) constituting the valve mechanism 18.

The body 16 includes a first cylindrical section 22 that extends along a straight line, and a second cylindrical section 24 connected to a substantially central part along the axial direction of the first cylindrical section 22.

The second cylindrical section 24 is joined perpendicularly with respect to the axis of the first cylindrical section 22, and extends upwardly at a predetermined height. In the vicinity of the adjoined region of the first cylindrical section 22 and the second cylindrical section 24, a pair of attachment holes 26 are formed, which are substantially perpendicular to the axis of the first cylindrical section 22 and through which non-illustrated bolts are inserted. In addition, the flow rate control valve 10 is affixed to another apparatus, not shown, through the bolts that are inserted through the attachment holes 26.

On one end of the first cylindrical section 22, the first port 12 opens, to which a pressure fluid is introduced, whereas on the other end thereof, the second port 14 opens, through which the pressure fluid is discharged. Tubes 30a, 30b are connected respectively to the first and second ports 12, 14, through connection units 28a, 28b, which are installed in openings of the first and second ports 12, 14.

More specifically, for example, a pressure fluid, which is supplied through the tube 30a from a non-illustrated pressure fluid supply source, is introduced into the first port 12, whereas the pressure fluid that has flowed through the interior of the body 16 is supplied to another fluid pressure apparatus (e.g., a cylinder) through the tube 30b, which is connected to the second port 14.

On the other hand, in the interior of the first cylindrical section 22, first and second passages (fluid passages) 32, 34 are formed, which extend along an axial direction from the first and second ports 12, 14. Together therewith, a communicating chamber 36 is formed between the first passage 32 and the second passage 34.

Ring shaped packings 38 proximate to the connection units 28a, 28b are mounted respectively in the first and second passages 32, 34, and ring shaped spacers 40 are mounted respectively at positions adjacent to the packings 38. The spacers 40 engage on steps, which are formed in the first and second passages 32, 34, such that movement toward the center of the first cylindrical section 22 is restricted and the spacers 40 are properly positioned. Movement of the packings 38 adjacent to the spacers 40 also is restricted, and the packings 38 are positioned by the spacers 40.

Additionally, the packings 38 abut against outer circumferential surfaces of the tubes 30a, 30b that are inserted from the first and second ports 12, 14, so that any pressure fluid, which may have passed through the outer circumferential side of the tubes 30a, 30b, is prevented from leaking externally.

Further, a first wall portion 42 facing the communicating chamber 36 is disposed at an end of the first passage 32, perpendicularly with respect to the direction of extension of the first passage 32. The first passage 32 communicates with the communicating chamber 36 via a communication passage 44a that opens between the first wall portion 42 and an inner wall surface of the first passage 32.

Similarly, a second wall portion 46 facing the communicating chamber 36 is disposed at an end of the second passage 34, perpendicularly with respect to the direction of extension of the second passage 34. The second passage 34 communicates with the communicating chamber 36 via a communication passage 44b that opens between the second wall portion 46 and an inner wall surface of the second passage 34.

Moreover, the first wall portion 42 extends from a downward position upwardly in the interior of the first passage 32, such that the communication passage 44a is formed at an upward location in the first passage 32. The second wall portion 46 extends from an upper position downwardly in the interior of the second passage 34, such that the communication passage 44b is formed at a downward location in the second passage 34.

Stated otherwise, the communication passage 44a in the first passage 32 and the communication passage 44b in the second passage 34 are formed differently from each other, at mutually opposite locations along directions perpendicular to the axis of the first cylindrical section 22.

The communicating chamber 36 is formed coaxially with the second cylindrical section 24, and a portion of the valve mechanism 18 is inserted through the interior of the communicating chamber 36.

The second cylindrical section 24 opens upwardly. In the interior thereof, an installation hole 48, in which the valve mechanism 18 is installed, is formed so as to extend in a vertical direction. The installation hole 48 communicates with the communicating chamber 36 of the first cylindrical section 22. More specifically, the installation hole 48 is formed coaxially with the communicating chamber 36 of the first cylindrical section 22.

The valve mechanism 18 includes a valve holder (sub-body) 50, which is press-fitted with respect to the installation hole 48 of the second cylindrical section 24, a tubular shaped seat ring (seat member) 52 mounted on a lower portion of the valve holder 50, and a needle valve 54 inserted through the interior of the valve holder 50 and the seat ring 52, and which is displaceable in an axial direction (the direction of arrows A and B).

The valve holder 50 is formed in a cylindrical shape, with a pair of projections 56a, 56b, separated mutually by a predetermined distance, being formed on an outer circumferential surface of the valve holder 50. The first projection 56a is formed, for example, from a laurette (knurls) which, by engagement within grooves of the installation hole 48, prevents rotation of the valve holder 50 with respect to the second cylindrical section 24. The other projection 56b, by engagement within another groove, prevents outward leakage of pressure fluid that has passed between the installation hole 48 and the valve holder 50. At this time, the upper end of the valve holder 50 is installed so as to project slightly outward with respect to the upper end of the second cylindrical section 24.

On the lower end of the valve holder 50, a retaining member 58 is formed, which is reduced in diameter slightly in a radial inward direction. On the upper end of the retaining member 58, an annular groove 60 is formed, which is recessed in a radial inward direction. In addition, the seat ring 52 is mounted so as to cover the outer circumferential surface of the retaining member 58, and a hook (bent portion) 66 (described later), which is formed on an upper end of the seat ring 52, is inserted into the annular groove 60 for engagement therewith. Owing thereto, the seat ring 52 is connected integrally onto the lower end of the valve holder 50.

Further, the lower end surface 58a of the retaining member 58 is formed in a planar shape perpendicular to the axis of the valve holder 50.

On the other hand, in the interior of the valve holder 50, a constant diameter valve hole 62 is formed, through which the needle valve 54 is inserted along the axial direction (the direction of arrows A and B). A first screw section 64 having female screws engraved therein is disposed at the upper end of the valve hole 62. The first screw section 64 is reduced in diameter slightly in a radial inward direction with respect to the inner circumferential diameter of the valve hole 62.

The seat ring 52 is formed, for example, by press molding from a thin sheet of metal, and is disposed inside the communicating chamber 36. The seat ring 52 comprises a large diameter portion 68 formed on the upper end thereof and connected to the valve holder 50, a small diameter portion 70 formed on the lower end portion for seating of the needle valve 54, and an intermediate portion 72 formed between the large diameter portion 68 and the small diameter portion 70. The large diameter portion 68 is formed with the greatest diameter in the seat ring 52, whereas the intermediate portion 72 is formed with a smaller diameter, reduced in diameter with respect to the large diameter portion 68, and the small diameter portion 70 is formed with a diameter which is further reduced in diameter with respect to the intermediate portion 72. The seat ring 52 is not limited to the case of being formed by press molding from a metal material, but may also be formed by molding a resin material, for example.

More specifically, the seat ring 52 is formed so as to be reduced in diameter stepwise from the upper end to the lower end thereof. Also, the aforementioned large diameter portion 68, the intermediate portion 72, and the small diameter portion 70 are formed coaxially so as to reside along the same axis.

A hook 66 bent radially inward at a predetermined angle is formed on the upper end of the large diameter portion 68. When the large diameter portion 68 is press-fitted to cover the retaining member 58 of the valve holder 50, the hook 66 engages within the annular groove 60, and the lower end of the retaining member 58 abuts against a stepped part (abutment portion) 74, which is disposed at a boundary region between the large diameter portion 68 and the intermediate portion 72. The stepped part 74 is bent perpendicularly in a radial inward direction with respect to the lower end of the large diameter portion 68 and is adjoined to the upper end of the intermediate portion 72.

Owing thereto, when the seat ring 52 is installed on the retaining member 58 of the valve holder 50, the stepped part 74 is latched by abutment against the end of the retaining member 58, and becomes positioned along the axial direction (the direction of arrows A and B) with respect to the valve holder 50. More specifically, when the valve holder 50 and the seat ring 52 are assembled together, the lower end surface 58a of the retaining member 58 and the stepped part 74 function as a positioning mechanism, which is capable of positioning the valve holder 50 and the seat ring 52, so as to become mutually coaxial.

Further, at this time, by abutment of the lower end surface (surface) 58a of the retaining member 58 with respect to the stepped part 74, concentricity of the valve holder 50 and the seat ring 52 is maintained, while the valve holder 50 and the seat ring 52 are arranged coaxially. More specifically, the valve holder 50 and the seat ring 52 are positioned coaxially by mutual abutment of the stepped part 74 and the retaining member 58.

A plurality of (e.g., four) communication ports 76 are formed on the circumferential surface of the intermediate portion 72 perpendicular to the axis of the seat ring 52, thus placing the exterior and interior regions of the intermediate portion 72 in communication with each other. The communication ports 76 are formed at equal intervals along the circumferential direction of the intermediate portion 72. The communication ports 76 are formed simultaneously when the seat ring 52 is formed by press molding. Stated otherwise, another separate process step is not required for the purpose of forming the communication ports 76.

On the small diameter portion 70, the vicinity of an adjoining region thereof with the intermediate portion 72 projects radially inward, thereby forming a seat portion 78 for seating of the needle valve 54. Together therewith, on the lower end of the small diameter portion 70, a flange 80 is formed, which is expanded in diameter radially outward.

In addition, a tubular shaped seal member 82 made from an elastic material such as rubber or the like is installed on an outer circumferential side of the small diameter portion 70. A rib 84 is formed on the outer circumferential surface of the seal member 82, which is inclined upward in a radial outward direction at a predetermined angle of inclination. The rib 84 abuts respectively against the first wall portion 42 and the second wall portion 46 inside the communicating chamber 36.

Consequently, inside the communicating chamber 36, the flow of pressure fluid, which passes between the outer circumferential side of the seat ring 52 and the first and second wall portions 42, 46, is blocked by the seal member 82. Further, because the seal member 82 is retained between the flange 80 and a stepped part formed at the boundary region of the intermediate portion 72 and the small diameter portion 70, the seal member 82 is positioned without being subject to displacement in the axial direction (the direction of arrows A and B).

The needle valve 54 is formed from a shaft (axial body) having a predetermined length along the axial direction (the direction of arrows A and B). The upper end of the needle valve 54 projects upwardly with respect to the upper end of the valve holder 50 and the second cylindrical section 24, and is connected to the handle 20. Further, a second screw section 86, in which threads are engraved in the vicinity of the upper end thereof, is formed on the outer circumferential side of the needle valve 54 and is screw-engaged with the first screw section 64 of the valve holder 50. Specifically, upon rotating the needle valve 54 via the handle 20, by screw-engagement with the valve holder 50, the needle valve 54 is moved in an advancing/retracting manner along the axial direction (the direction of arrows A and B).

On the other hand, on the lower end of the needle valve 54, a control member 88 is formed, which is gradually reduced in diameter toward the end thereof, and is capable of insertion into the small diameter portion 70 of the seat ring 52. The control member 88 includes a first control surface 90 disposed on the farthest distal end thereof, and a second control surface 92 formed upwardly of the first control surface 90. The first control surface 90 is set with an angle of inclination, with respect to the axis of the needle valve 54, that is greater in comparison to the angle of inclination of the second control surface 92. More specifically, the first control surface 90 is formed in a tapered shape, which is tapered even further than that of the second control surface 92.

In addition, by displacement of the needle valve 54 upwardly from the condition shown in FIG. 1 and separation of the second control surface 92 from the seat portion 78 of the seat ring 52, pressure fluid passes between the seat portion 78 and the second control surface 92, and flows in the seat ring 52 toward the side of the small diameter portion 70 from the intermediate portion 72.

Further, on an upper part of the control member 88, a stopper 94 is formed, which is expanded in diameter with respect to the control member 88. An o-ring 96, which is installed on the outer circumferential surface of the stopper 94, is kept in sliding contact continuously with an inner circumferential surface of the valve hole 62 in the valve holder 50. As a result, leakage of pressure fluid introduced to the interior of the seat ring 52 through the valve hole 62 is prevented by the o-ring 96.

In addition, when the needle valve 54 is displaced along the axial direction, the upper end of the stopper 94 is displaced along the valve hole 62 of the valve holder 50, whereupon by abutment thereof against the lower end of the radially inward projecting first screw section 64, upward displacement (in the direction of arrow B) of the needle valve 54 is regulated. On the other hand, by abutment of the lower end of the stopper 94 against a boundary region in the seat ring 52 between the small diameter portion 70 and the intermediate portion 72, downward displacement (in the direction of arrow A) of the needle valve 54 is regulated. That is, the stopper 94 is provided so as to regulate the displacement amounts along the axial direction (the direction of arrows A and B) of the needle valve 54.

Further, upwardly of the second cylindrical section 24 constituting the body 16, a lock nut 98 is disposed coaxially with the second cylindrical section 24. The second screw section 86 of the needle valve 54 is screw-engaged in the center of the lock nut 98. By screw-rotation of the lock nut 98, the lock nut 98 can be displaced relatively in the axial direction (the direction of arrows A and B) with respect to the needle valve 54. Additionally, after the needle valve 54 has been rotated via the handle 20 and displaced to a position at which the pressure fluid flows through the interior of the body 16 at a predetermined flow rate, by screw-rotating the lock nut 98 so as to displace the lock nut 98 to a position in abutment against the upper end of the valve holder 50, since further rotational displacement of the needle valve 54 is restricted, the flow rate controlled condition can be maintained by the needle valve 54.

The flow rate control valve 10 according to the embodiment of the present invention is basically constructed as described above. Next, an explanation shall be made concerning a method of assembling the valve mechanism 18 constituting the flow rate control valve 10.

First, the needle valve 54 together with the o-ring 96 mounted on the outer circumferential surface thereof is inserted from below with respect to the valve hole 62 of the valve holder 50, and the second screw section 86 is inserted upwardly (in the direction of arrow B) while being screw-engaged with the first screw section 64 provided in the valve hole 62. At this time, the o-ring 96 is in sliding contact with the valve hole 62 of the valve holder 50.

Next, the large diameter portion 68 of the seat ring 52 is press-fitted from below with respect to the retaining member 58 of the valve holder 50, and the lower end surface 58a of the retaining member 58 abuts against the stepped part 74 of the seat ring 52. Additionally, the hook 66 of the seat ring 52 is pressed radially inward by a non-illustrated crimping jig, whereby the hook 66 is bent and engages within the annular groove 60 formed in the retaining member 58. As a result, the seat ring 52 is press-fitted with respect to the valve holder 50, and further, the seat ring 52 and the valve holder 50 are connected together integrally in a coaxially arranged state by abutment of the retaining member 58 of the valve holder 50 against the stepped part 74 of the seat ring 52.

At this time, by maintaining concentricity of the valve holder 50 and the seat ring 52, the needle valve 54, which is screw-engaged in the valve holder 50, and the seat ring 52 are arranged in coaxial alignment with each other.

In addition, after the seal member 82 has been installed on the small diameter portion 70 of the seat ring 52, the lock nut 98 is screw-engaged and rotated on the second screw section 86 of the needle valve 54, which projects upwardly beyond the valve holder 50, whereby the lock nut 98 is moved in a downward direction (the direction of arrow A).

Finally, after the handle 20 has been press-fitted onto an upper end of the needle valve 54, the assembly, made up of the valve holder 50 including the needle valve 54 and the seat ring 52, is press-fitted from the second cylindrical section 24 of the body 16 into the installation hole 48. The projections 56a disposed on the outer circumferential surface of the valve holder 50 engage within grooves of the installation hole 48, whereby the valve holder 50 is affixed in a non-rotatable state.

In this manner, in the valve holder 50 and the seat ring 52 that make up the valve mechanism 18, the lower end surface 58a of the retaining member 58 is formed to be perpendicular to the axis of the valve holder 50, and together therewith, the stepped part 74 between the large diameter portion 68 and the intermediate portion 72 is formed perpendicular to the axis of the seat ring 52. As a result, when the valve holder 50 and the seat ring 52 are assembled, the lower end surface 58a of the retaining member 58 abuts against the stepped part 74, and moreover, by press-fitting the large diameter portion 68 of the seat ring 52 with respect to the outer circumferential surface of the retaining member 58, squareness of the lower end surface 58a and the stepped part 74 with respect to the axis of the valve holder 50 and the seat ring 52 is assured. Owing thereto, the valve holder 50 and the seat ring 52 can be positioned and arranged in a coaxial manner.

More specifically, by means of a simple operation by which the seat ring 52 is assembled onto the lower end of the valve holder 50, the valve holder 50 and the seat ring 52 can be disposed coaxially and connected together easily and assuredly.

As a result, the needle valve 54, which is engaged in the valve holder 50, and the seat ring 52 can be made coaxial, so that when the needle valve 54 is displaced along the valve holder 50, the interval of separation between the control member 88 of the needle valve 54 and the seat portion 78 can be made uniform in the radial direction, whereby the flow rate of pressure fluid through the gap therebetween is capable of being controlled with high precision.

Next, operations and effects of the flow rate control valve assembled in the foregoing manner shall briefly be explained. Herein, as shown in FIG. 1, an initial condition shall be described, in which the needle valve 54 constituting the valve mechanism 18 is lowered under a rotating action of the handle 20, and communication between the first port 12 and the second port 14 is blocked in a totally closed state.

In such an initial condition, pressure fluid is supplied to the first port 12 through the tube 30a, and further is supplied into the communicating chamber 36 through the communication passage 44a. The pressure fluid introduced to the communicating chamber 36 is prevented, by the seal member 82 disposed on the outer circumferential side of the seat ring 52, from flowing past the outer circumferential side of the seat ring 52 and flowing downstream to the second port 14. Additionally, after an operator (not shown) has screw-rotated the lock nut 98 and moved the same upwardly to release the restricted condition of rotational displacement of the needle valve 54, the handle 20 is gripped and rotated, whereby the needle valve 54 is displaced upwardly (in the direction of arrow B) while being rotated under threaded engagement of the needle valve 54 with the valve holder 50.

Consequently, from a condition in which the second control surface 92 of the control member 88 abuts against the seat portion 78, the needle valve 54 separates gradually away from the seat portion 78, and the gap between the second control surface 92 and the seat portion 78 gradually is increased. In addition, the pressure fluid introduced to the interior of the communicating chamber 36 flows from the communication ports 76 of the seat ring 52 through to the interior of the seat ring 52, and flows between the seat portion 78 and the control member 88 of the needle valve 54 to the side of the small diameter portion 70 (in the direction of arrow A). At this time, the flow rate of the pressure fluid is controlled proportional to the size of the gap between the seat portion 78 and the control member 88 of the needle valve 54. After the pressure fluid has passed the communication passage 44b and flowed from the interior of the communicating chamber 36 to the second passage 34, the pressure fluid flows to another fluid pressure apparatus at a predetermined flow rate through the tube 30b, which is connected to the second port 14.

More specifically, the displacement amount of the needle valve 54 along the axial direction (in the direction of arrows A and B) is proportional to the flow rate of the pressure fluid that flows through the communicating chamber 36 to the side of the second port 14. Stated otherwise, by controlling the displacement amount of the needle valve 54, the flow rate of the pressure fluid is controlled.

Further, by turning the handle 20 and moving the first control surface 90 of the needle valve 54 to a position facing the seat portion 78, the flow rate of the pressure fluid that flows between the seat portion 78 and the first control surface 90, which is set at an angle of inclination larger than that of the second control surface 92, can be further increased.

On the other hand, in the case that the flow rate of the pressure fluid is decreased, the handle 20 is rotated in an opposite direction to that described above, whereby the needle valve 54 is moved downwardly (in the direction of arrow A) along the valve holder 50. As a result, the control member 88 approaches the seat portion 78, and since the gap between the control member 88 and the seat portion 78 gradually becomes smaller, the flow rate of the pressure fluid that flows through the gap to the downstream side is decreased. In addition, by further rotating the handle 20 so that the lower end of the stopper 94 in the needle valve 54 abuts against the seat portion 78, downward movement of the needle valve 54 is regulated, resulting in a totally closed condition in which the second control surface 92 of the control member 88 is in abutment against the seat portion 78.

In this manner, fluid controlled at a predetermined flow rate in the flow rate control valve 10 is supplied to another fluid pressure apparatus from the second port 14 via the tube 30b, whereby operations of the fluid pressure apparatus are controlled.

In the foregoing manner, according to the present embodiment, when the valve holder 50 and the seat ring 52 constituting the flow rate control valve 10 are assembled, the seat ring 52 is press-fitted onto the retaining member 58 in the valve holder 50. In addition, by abutment of the stepped part 74 of the seat ring 52 against the lower end surface 58a of the retaining member 58, the valve holder 50 and the seat ring 52 can be assembled reliably and easily on the same axis, by means of the lower end surface 58a and the stepped part 74, which are perpendicular to the axis of the valve holder 50 and the seat ring 52.

As a result, since the needle valve 54 that moves along the axis of the valve holder 50 can be arranged coaxially with the seat ring 52, the needle valve 54 can be seated against the seat portion 78 with high precision. Also, when the needle valve 54 is displaced along the axial direction, the gap formed between the control member 88 and the seat portion 78 is created uniformly in the radial direction, so that the flow rate of pressure fluid flowing through the gap can be controlled highly precisely.

Further, because the seat ring 52 can be manufactured easily and at a low cost by press molding a thin plate material, compared to a flow rate control valve according to the conventional technique in which the valve body thereof is manufactured by a cutting process, manufacturing can be performed at a lower cost. Similarly, since the communication ports 76 of the seat ring 52 can also be formed easily by press molding, compared to a case in which the communication ports 76 are formed separately by a cutting process or the like, the number of process steps is reduced, and productivity in manufacturing the flow rate control valve 10 can be improved.

The flow rate control valve and method of assembly therefor according to the present invention are not limited to the above-described embodiment. It is a matter of course that various other structures could be adopted without departing from the essence of the invention as set forth in the appended claims.

The invention claimed is:

1. A flow rate control valve, which is capable of controlling the flow rate of a fluid that flows between a pair of ports by displacing a rod, comprising:
a valve mechanism in an axial direction, the valve mechanism including:
a body having the ports and a pair of fluid passages through which fluid supplied from the ports flows;
a sub-body disposed in an interior of the body, and in which the rod is screw-engaged in an advancing and retracting manner; and
a tubular shaped seat connected to an end of the sub-body, including
a seat structure to seat the rod thereon,
a hole that communicates between one of the fluid passages and another of the fluid passages, and
an outwardly extending step above the hole that surrounds the end of the sub-body and that stops an end surface of the sub-body from moving past the outwardly extending step.

2. A flow rate control valve according to claim 1, wherein a positioning mechanism, which arranges the sub-body and the seat on the same axis, is provided on the sub-body and the seat.

3. A flow rate control valve according to claim 2, wherein the positioning mechanism comprises:
a surface formed on an end of the sub-body, which is perpendicular with respect to the axis of the sub-body; and
an abutment portion of the seat, which is perpendicular to the axis of the seat, and which abuts against the surface.

4. A flow rate control valve according to claim 1, wherein a seal, which abuts against an inner wall surface of the body and blocks communication between one of the fluid passages and another of the fluid passages, is mounted on an outer circumferential side of the seat.

5. A flow rate control valve according to claim 1, wherein the seat is installed so as to cover the end of the sub-body, and engages with the sub-body through a bent portion, which is bent radially inward.

6. A flow rate control valve according to claim 1, wherein the seat is press-fitted with respect to the sub-body.

7. A flow rate control valve according to claim 1, wherein the seat is formed by premolding.

8. A flow rate control valve according to claim 5, wherein a retaining structure, which is reduced in diameter radially inward, is formed on a lower end of the sub-body, and an annular groove, which is recessed radially inward, is formed on an upper end of the retaining structure, the bent portion being engaged within the annular groove.

9. A flow rate control valve according to claim 1, wherein the seat comprises a large diameter portion formed on an upper end part and connected to the sub-body, a small diameter portion formed on a lower end structure to seat the rod thereon, and an intermediate portion formed between the large diameter portion and the small diameter portion.

10. A flow rate control valve according to claim 9, the hole being formed as a plurality of holes along a circumferential surface on the intermediate portion in a direction perpendicular to the axis of the seat, wherein an exterior and an interior of the intermediate portion communicate through the plurality of holes.

11. A flow rate control valve according to claim 1, wherein a control structure, which is gradually reduced in diameter toward a distal end thereof and is insertable into the seat structure, is formed on the lower end portion of the rod, the control structure comprising a first control surface disposed at the farthest end point thereof, and a second control surface formed above the first control surface, wherein an angle of inclination of the first control surface with respect to the axis of the rod is set to be greater in comparison to an angle of inclination of the second control surface.

12. A flow rate control valve according to claim 1, wherein an upper end of the seat includes a hook that engages an annular groove formed in an outer surface of the sub-body.

* * * * *